Oct. 21, 1947.    J. CEDAR    2,429,393
BRACELET CHAIN
Filed Oct. 3, 1945
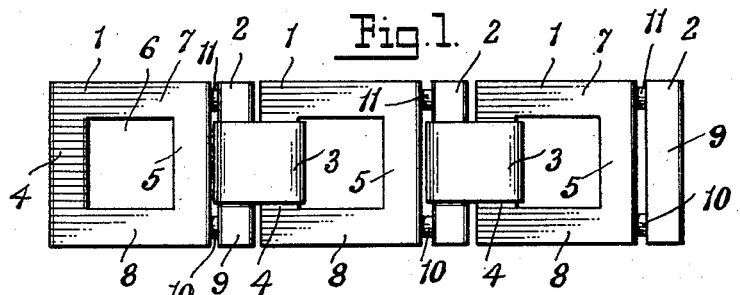
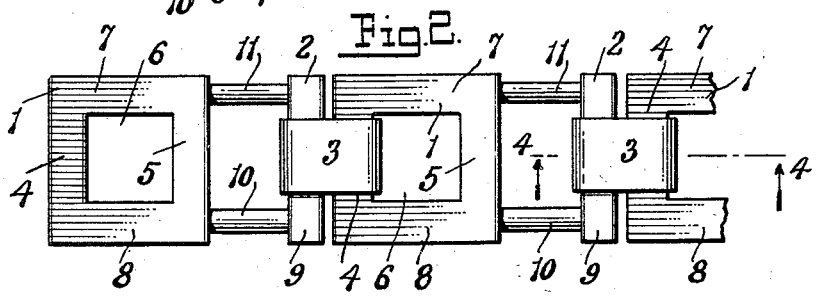
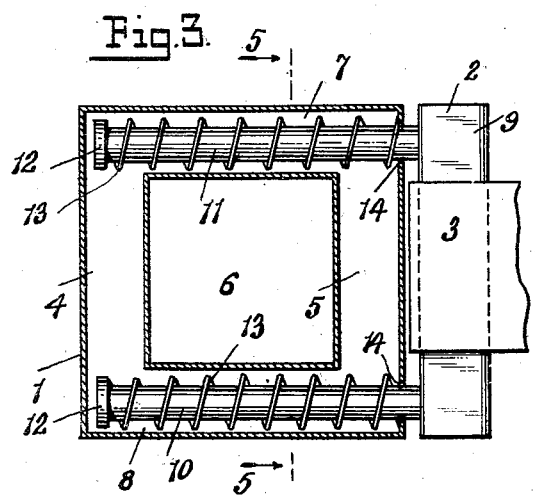
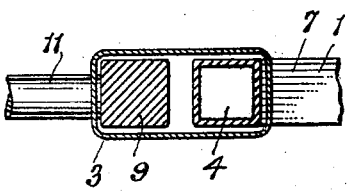
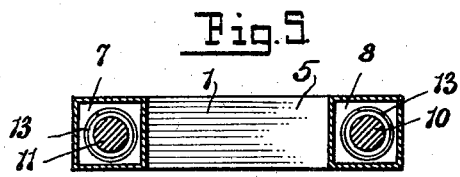
INVENTOR.
Julius Cedar
BY
Harry Radzinsky
Attorney Patented Oct. 21, 1947

2,429,393

UNITED STATES PATENT OFFICE 2,429,393

BRACELET CHAIN

Julius Cedar, New York, N. Y.

Application October 3, 1945, Serial No. 620,007

3 Claims. (Cl. 59—79)

This invention relates to bracelets and other chain-like structures and particularly to those of the expansible link type, wherein spring means is provided by which a resilient connection is established between the links so that the same may be spread apart when placing the bracelet on or removing the same from about the wrist.

An object of the invention is to provide a bracelet of this character in which the aspect of a conventional type of non-expansible bracelet is present, yet the convenience of expansibility is had. The structure of a bracelet of the present type is such that while the appearance of the conventional open-link chain type is presented, an arrangement of spring means is contained within the links and considerable expansibility is provided.

More particularly, the invention contemplates the provision of a chain composed of a plurality of link members each having a plurality of tubular or hollow guide passages, and connection elements disposed between the link members, each connection member including spaced leg elements slidably mounted in the guide-ways of the links and resiliently maintained therein by spring means which allows a limited sliding movement of the connection members against the tension of the spring means.

In the accompanying drawing, Fig. 1 is a face view of a bracelet or portion of a chain structure, constructed according to the invention; Fig. 2 shows the structure in its expanded condition; Fig. 3 is an enlarged view of one of the links with one of its face plates removed to show the interior construction; Fig. 4 is a sectional view on the line 4—4 of Fig. 2, looking in the direction of the arrows, and Fig. 5 is a sectional view on the line 5—5 of Fig. 3, looking in the direction of the arrows.

In the drawing, I indicates the main links of the bracelet. Each of said links, in the form shown, consists of a rectangular hollow structure, provided with a pair of parallel hollow side bars 7 and 8 integrally joined by the end bars 4 and 5, the structure so arranged providing the central aperture 6 in the link. Each of the hollow links I is engaged by a U-shaped connection member 2, the same, in the form disclosed, consisting of a transverse bar 9 having two spaced parallel legs 10 and 11, said legs being slidably movable in the hollow side bars 7 and 8 of the link into which the legs 10 and 11 extend.

Spaced apertures 14 are provided in the end bar 5 of the link I through which the legs 10 and 11 extend to enter into the bars 7 and 8.

A coil spring 13 surrounds each of the legs 10 and 11, said springs being located between the head 12 at the end of each of the legs 10 and 11, and the end wall of the bar 5 in which the apertures 14 are located. The arrangement of the springs 13 is such that the springs tend to normally maintain the legs 10 and 11 within the bars 7 and 8 to a maximum extent, thus bringing the cross bar 9 closely adjacent to the bar 5 while the bracelet is in an unstretched condition, as shown in Fig. 1.

A loop 3 extends about the cross bar 9 and it also encompasses the cross bar 4 of the next link I so that between each two links I, one of the cross bars 9 on a connection member 2 will be located.

It will be clear from the foregoing, that the bracelet is readily expanded by an endwise pull, this serving to compress the springs 13 as the legs 10 and 11 of the several connection members 2 are drawn in a direction outwardly of the links in which they are normally housed. The bracelet in its expanded condition is clearly shown in Fig. 2.

I am aware that prior to the present invention, efforts have been made to provide bracelets or expansible chain structures wherein telescopic movement of the links was effected, but in prior arrangements of this general character the effect of a true open-link bracelet was destroyed by the housing of the springs and other parts of the bracelet in box-like or enclosed links. The present arrangement provides a bracelet having open links and the aspect of a true chain type is always present regardless of whether the links are in expanded or unexpanded condition.

In herein referring to the shape of the several links and the connection means therefor, I have stated that the same are of substantially rectangular form. It will be clear however, that these links may be made in various other forms and designs and otherwise ornamented, yet be comprehended as within the scope of the present invention.

What I claim is:

1. In an expansible bracelet, a link in the form of a substantially square, open-center frame having a cross bar at each end, a coupling member telescopic into the link, the link being provided with a pair of internal guideways in its sidebars, the coupling member having a pair of legs entering said guideways at one end and slidable therein, a cross-bar on the coupling member connecting each leg at one end to the other, and springs in the guideways surrounding the legs and acting to urge the cross-bar on the coupling member toward one end of the link.

2. In an expansible bracelet, a link in the form of a substantially rectangular open-center frame, said frame having a pair of tubular side members, a U-shaped coupling element having a pair of parallel legs entering at one end of the side members slidably mounted in said tubular side members, springs located in said hollow side members and surrounding the legs and acting to urge the connecting member toward the frame, the parallel legs on the coupling member being connected by a cross piece located on the outside of the link, and a loop surrounding said cross piece and also surrounding the end member of an adjacent link.

3. In an expansible bracelet, a box-like hollow four-sided link having a pair of parallel tubular side bars, a U-shaped connecting member having leg portions entering one end of the side bars and slidable in said side bars, coil springs in said side bars and disposed around the leg portions and tending to urge the leg portions to maximum insertion within the side bars, and a cross member located externally of the link and connecting the leg portions and carrying means for flexibly connecting it to an adjacent hollow link.

JULIUS CEDAR.

REFERENCES CITED

The following references are of record in the file of this patent:

UNITED STATES PATENTS

| Number | Name | Date |
|---|---|---|
| 1,927,044 | Nelson | Sept. 19, 1933 |

FOREIGN PATENTS

| Number | Country | Date |
|---|---|---|
| 107,464 | Great Britain | July 5, 1917 |
| 161,718 | Great Britain | Apr. 21, 1921 |